US010000911B2

(12) United States Patent
You

(10) Patent No.: US 10,000,911 B2
(45) Date of Patent: Jun. 19, 2018

(54) ABNORMALITY DIAGNOSTIC SYSTEM FOR WORK SYSTEM OF CONSTRUCTION MACHINERY AND METHOD USING THE SAME

(71) Applicant: Doosan Infracore Co., Ltd., Incheon (KR)

(72) Inventor: Seung-bum You, Seoul (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 129 days.

(21) Appl. No.: 15/101,707

(22) PCT Filed: Dec. 5, 2014

(86) PCT No.: PCT/KR2014/011890

§ 371 (c)(1),
(2) Date: Jul. 28, 2016

(87) PCT Pub. No.: WO2015/084089

PCT Pub. Date: Jun. 11, 2015

(65) Prior Publication Data

US 2017/0002549 A1 Jan. 5, 2017

(30) Foreign Application Priority Data

Dec. 5, 2013 (KR) ........................ 10-2013-0150633

(51) Int. Cl.
*G06F 7/70* (2006.01)
*G06F 19/00* (2018.01)
(Continued)

(52) U.S. Cl.
CPC ............ *E02F 9/267* (2013.01); *E02F 9/2025* (2013.01); *G07C 5/0808* (2013.01); *G07C 5/0816* (2013.01); *G07C 5/0841* (2013.01)

(58) Field of Classification Search
CPC ....... E02F 9/267; E02F 9/2025; G07C 5/0808
(Continued)

(56) References Cited

U.S. PATENT DOCUMENTS

| | | | | |
|---|---|---|---|---|
| 5,617,723 A * | 4/1997 | Hosseini | ................ | E02F 3/434 60/327 |
| 6,098,322 A * | 8/2000 | Tozawa | .................. | E02F 3/437 37/414 |

(Continued)

FOREIGN PATENT DOCUMENTS

| | | |
|---|---|---|
| JP | 1994-193099 | 7/1994 |
| JP | 2003227471 | 8/2003 |
| KR | 10-2000-0000617 | 1/2000 |

OTHER PUBLICATIONS

International Search Report for International Patent Application PCT/KR2014/011890 dated Mar. 10, 2015.

(Continued)

*Primary Examiner* — Isaac G Smith
(74) *Attorney, Agent, or Firm* — K&L Gates LLP

(57) ABSTRACT

An abnormality diagnostic system for a work system of construction machinery includes an input portion configured to receive state information of an engine, a hydraulic pump and a work apparatus, a controller configured to calculate and mutually compare horsepower information of the engine, the hydraulic pump and the work apparatus from the received state information, and if the horsepower information are different from each other by a preset range or more, determine whether or not abnormality occurs in any one of the engine, the hydraulic pump and the work apparatus, and an output portion configured to output the determination result of abnormality.
Accordingly, an abnormal situation of the construction machinery may be precisely diagnosed and notified immediately so as to make a quick response, and further, a
(Continued)

manufacturer of the construction machinery may collect the abnormality situation data to database to reflect in a product design.

9 Claims, 9 Drawing Sheets

(51) Int. Cl.

| | |
|---|---|
| ***E02F 9/26*** | (2006.01) |
| ***E02F 9/20*** | (2006.01) |
| ***G07C 5/08*** | (2006.01) |

(58) Field of Classification Search
USPC .................................................. 701/50
See application file for complete search history.

(56) References Cited

U.S. PATENT DOCUMENTS

| | | | | |
|---|---|---|---|---|
| 6,148,258 | A | 11/2000 | Boisvert et al. | |
| 6,823,289 | B2 * | 11/2004 | Kasuya | F04B 23/06 702/185 |
| 2003/0093203 | A1 * | 5/2003 | Adachi | E02F 9/2045 701/50 |
| 2003/0144818 | A1 | 7/2003 | Kasuya et al. | |
| 2003/0146845 | A1 | 8/2003 | Imanishi | |
| 2007/0213855 | A1 | 9/2007 | Furuno et al. | |

OTHER PUBLICATIONS

Written Opinion for International Patent Application PCT/KR2014/011890 dated Mar. 10, 2015.
Office Action issued in corresponding Korean Patent Application No. 10-2016-7015014 dated Sep. 1, 2017.

* cited by examiner

ABNORMALITY DIAGNOSTIC SYSTEM FOR WORK SYSTEM OF CONSTRUCTION MACHINERY AND METHOD USING THE SAME

CROSS-REFERENCE TO RELATED APPLICATION

The present application is a National Stage of International Application No. PCT/KR2014/011890, filed on Dec. 5, 2014, which claims priority to Korean Patent Application No. 10-2013-0150633, filed on Dec. 5, 2013, the entire contents of each of which are being incorporated herein by reference.

BACKGROUND

1. Field

Example embodiments relate to an abnormality diagnostic system for a work system of construction machinery and an abnormality diagnostic method using the same. More particularly, example embodiments relate to abnormality diagnostic system for a work system of construction machinery capable of identifying an abnormality position in a work system through comparison of an engine, a hydraulic pump and a work apparatus of construction machinery, and an abnormality diagnostic method using the same.

2. Description of the Related Art

An abnormality diagnostic method for construction machinery may be divided into a diagnosis method through direct observation and analysis and a diagnosis method using a sensor. The diagnosis method through direct observation and analysis may be categorized as a diagnosis method through an A/S engineer visit, a user self-diagnosis method, a diagnosis method through periodic sampling, etc.

The diagnosis method through an A/S engineer visit of the diagnosis method through direct observation and analysis may have advantages of reliability because an A/S engineer of a manufacturer has to visit directly into the field, but may have disadvantages that it is time-consuming until the actual visit and when there is diagnosis error, a re-visit has to be made. In addition, it can lead to considerable loss of time and money because an operator has to stop working during the diagnosis time.

The user self-diagnosis method of the diagnosis method through direct observation and analysis may have advantages to make a quick response because a skilled operator may manipulate directly and take a test to confirm a problem, but it is difficult to have confidence in the results and only the skilled operator can perform the diagnosis method.

Finally, according to the diagnosis method through periodic sampling of the diagnosis method through direct observation and analysis, a fluid sample of construction machinery may be sent periodically to the manufacturer, and the manufacturer may analyze the status and internal components of the fluid to predict the current state of the construction machinery and in which part a problem occurs. This may provide confidence in the results because the actual sample is analyzed, but a worker or a manager has to continue to send the fluid sample periodically and it is difficult to immediately respond thereto due to analysis time.

On the other hand, in the diagnosis method using a sensor, the sensor may be used to detect the state of the construction machinery part, and if the sensor measurement is not within a preset normal range, an existing problem situation is notified. This may provide a rapid results and a corresponding quick response, because the state of the part is continuously monitored through the sensor, but even when the part is normal and only the sensor is out of order, it should be serviced and repaired.

Referring to FIG. 2, an abnormality diagnostic method of construction machinery using a sensor is illustrated. According to this method, a position sensor and a pressure sensor are used to diagnose abnormality of a control system and a hydraulic part of construction machinery, such as an electro-proportion valve and a work apparatus.

However, as mentioned above, abnormality in the sensor itself cannot be diagnosed and it is limitedly applied only to the construction machinery using the electro-proportional valve. Additionally, the position sensor and the pressure sensor are required for all elements of the work apparatus such as a boom, an arm and a bucket.

PATENT DOCUMENT

Japanese Patent Publication No. 1994-193099 (Jul. 12, 1994)

SUMMARY

Example embodiments provide an abnormality diagnostic system for a work system of construction machinery and an abnormality diagnostic method, capable of resolving inaccuracy and long time consuming problem in an abnormality diagnosis of the construction machinery, wherein horsepower information of the work system including an engine, a hydraulic pump and an work apparatus are calculated and mutually compared with each other to secure accuracy of a measurement sensor, and a diagnosis result information about abnormality is transmitted immediately and rapidly.

According to example embodiments, an abnormality diagnostic system for a work system of construction machinery includes an input portion configured to receive state information of an engine, a hydraulic pump and a work apparatus of the construction machinery, a controller configured to calculate and mutually compare horsepower information of the engine, the hydraulic pump and the work apparatus from the received state information, and if the horsepower information are different from each other by a preset range or more, determine whether or not abnormality occurs in any one of the engine, the hydraulic pump and the work apparatus corresponding thereto, and an output portion configured to output the determination result of abnormality.

According to example embodiments, an abnormality diagnostic method for a work system of construction machinery includes a diagnosis setting step of setting an abnormality diagnosis mode in the construction machinery, a horsepower confirming step of obtaining horsepower information of an engine from an electronic control unit (ECU) and calculating horsepower information of a hydraulic pump using measurements detected by a pressure sensor and a flow sensor provided on the hydraulic pump, a range determining step of determining whether or not each of the horsepower information of the engine and the hydraulic pump is within a preset range, and a diagnosing step of determining abnormality of the engine or the hydraulic pump of the construction machinery according to the determination result from the range determining step.

According to an inventive concept, there are distinct effects as follows.

First, according to the diagnosis method through direct observation and analysis, it has disadvantages that it is time-consuming and inaccurate, while, according to the inventive concept, whether abnormality occurs in any part may be identified and an A/S engineer may know the abnormality beforehand before visit and bring a good part for the abnormal part, to thereby reduce a diagnosis time and improve accuracy.

Second, according to the diagnosis method using a sensor, when the part is normal and only the sensor is out of order, the diagnosis results are unreliable, while, according to the inventive concept, common characteristics such as horsepower of an engine, a hydraulic pump and a work apparatus may be confirmed by sensors and may be mutually compared be an abnormality diagnosis algorithm, to thereby reliably indentify abnormality of the sensor and the part as compared with the convention method.

Third, because the diagnosis results are outputted through an output device and may be transmitted remotely to the manufacturer of the construction machinery, the abnormality data may be collected to database, and further, may be reflected in a part or hydraulic circuit design, thereby improving the construction machinery.

BRIEF DESCRIPTION OF THE DRAWINGS

Example embodiments will be more clearly understood from the following detailed description taken in conjunction with the accompanying drawings.

DETAILED DESCRIPTION OF EXAMPLE EMBODIMENTS

Figure 1:
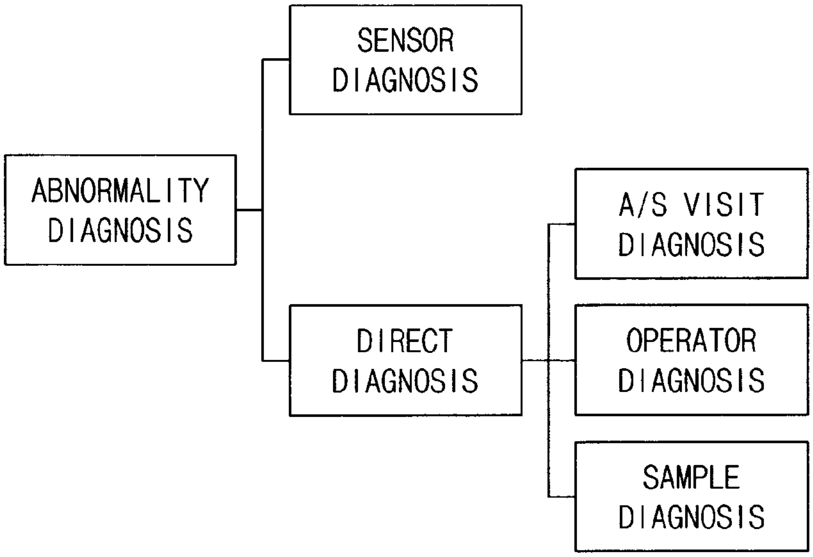
FIG. 1 is a block diagram illustrating an abnormality diagnostic method of construction machinery.
Figure 2:
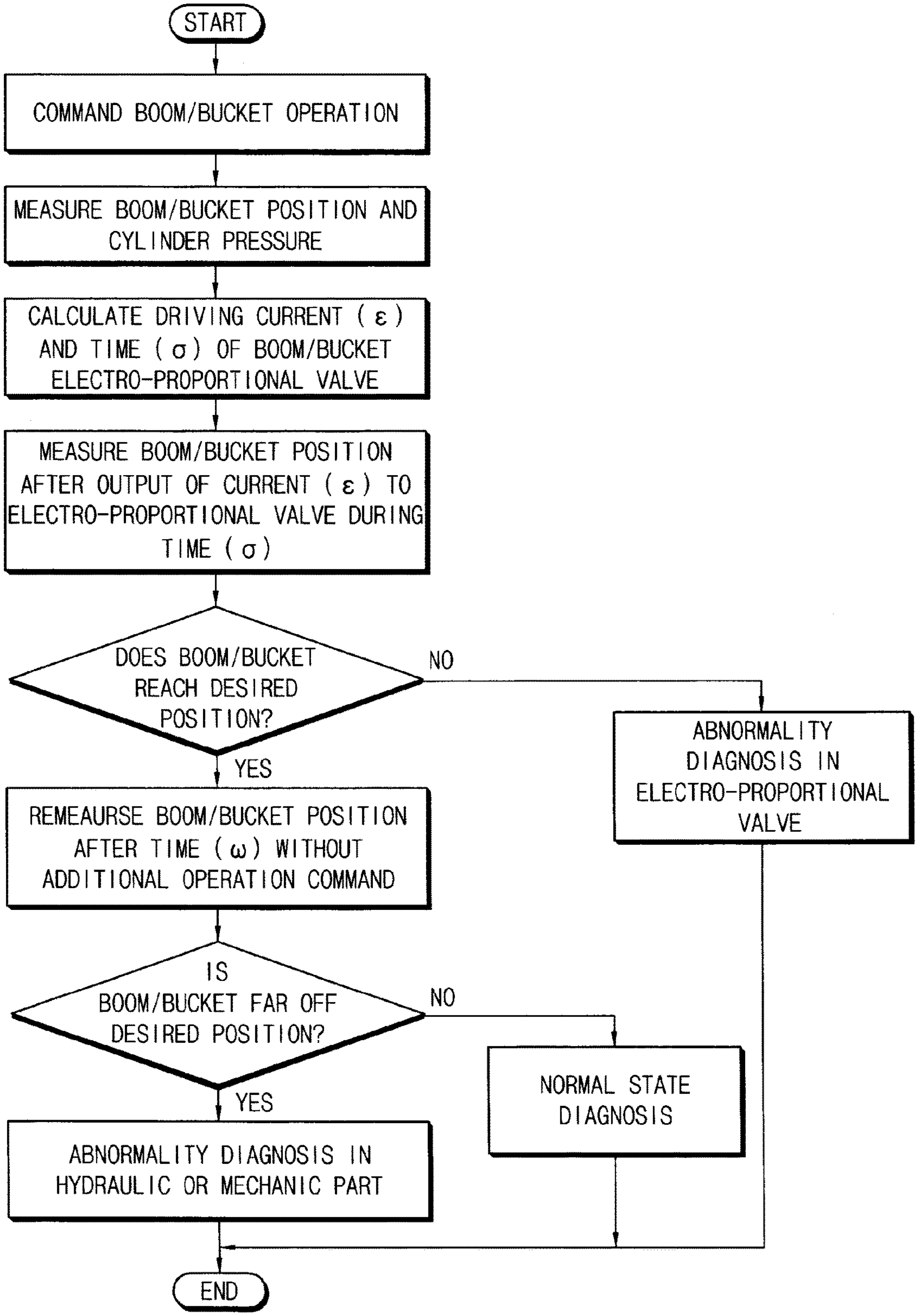
FIG. 2 is a flow chart illustrating a conventional abnormality diagnostic method using a sensor.

Various example embodiments will be described more fully hereinafter with reference to the accompanying drawings, in which example embodiments are shown. Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art. In the drawings, the sizes and relative sizes of components or elements may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element or layer is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
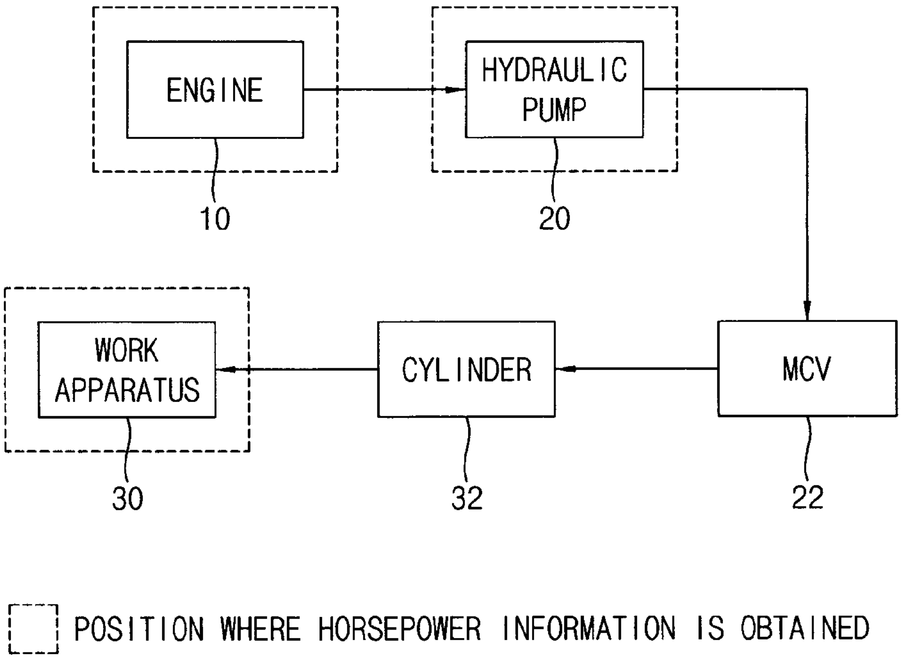
FIG. 3 is a block diagram illustrating a power flow in a work system of construction machinery in accordance with example embodiments.

FIG. 3 is a block diagram illustrating a power flow in a work system of construction machinery in accordance with example embodiments. First, a power flow in a work system of construction machinery will be explained with reference to FIG. 3.

Referring to FIG. 3, when construction machinery is started, an engine 10 may operate, and thus, a hydraulic pump 20 operatively connected to the engine 10 may be driven. Hydraulic oil discharged from the hydraulic pump 20 may be supplied to a main control valve (MCV) 22.

An operator may manipulate a joystick, a pedal, etc., to control a corresponding control valve of the main control valve 22 according to a manipulation signal, and then, the hydraulic oil may be supplied to a cylinder 32 of a work apparatus 30 connected to the corresponding control valve, to drive the work apparatus 30 such as boom, arm, bucket, etc.

In example embodiments, horsepower information of the engine 10, the hydraulic pump 20 and the work apparatus 30 may be compared with one another, to determine and monitor an abnormality occurring position in the work system of the construction machinery.

Figure 4:
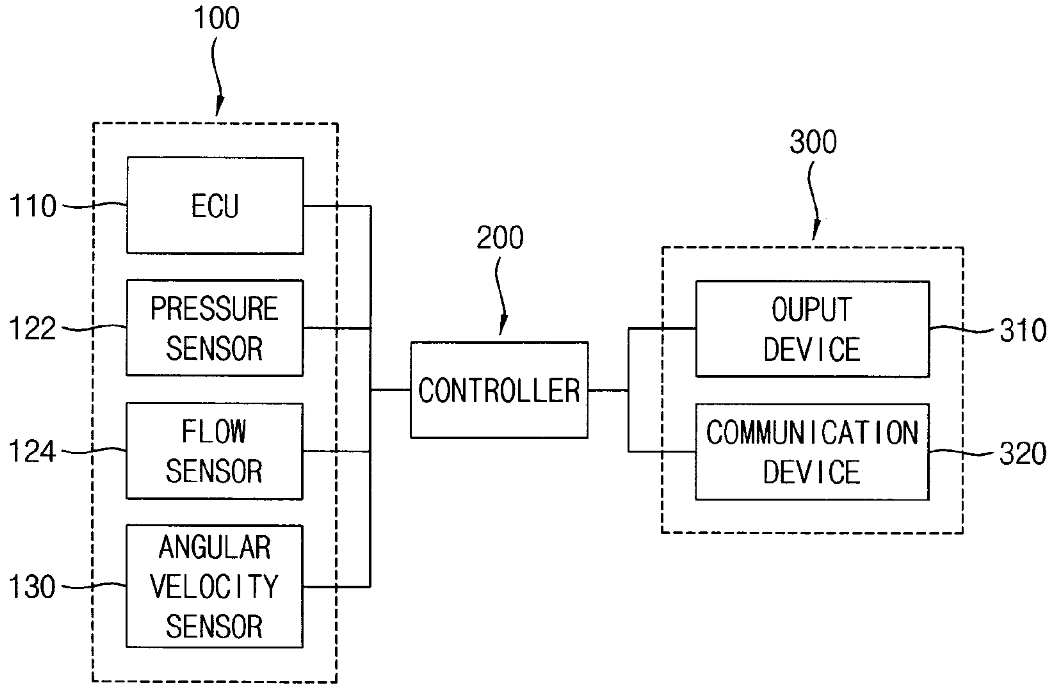
FIG. 4 is a block diagram illustrating an abnormality diagnostic system for a work system of construction machinery in accordance with example embodiments.

FIG. 4 is a block diagram illustrating an abnormality diagnostic system for a work system of construction machinery in accordance with example embodiments. A configuration and a function of the abnormality diagnostic system for the work system of construction machinery will be explained with reference to FIG. 4.

Referring to FIG. 4, an abnormality diagnostic system for a work system of construction machinery may include an input portion 100, a controller 200 and an output portion 300.

The input portion 100 may receive state information of the engine 10, the hydraulic pump 20 and the work apparatus 30 of the construction machinery. The input portion 100 may include a first receiver configured to receive the state information of the engine 10, a second receiver configured to receive the state information of the hydraulic pump 20 and a third receiver configured to receive the state information of the work apparatus 30.

For example, the first receiver may include an electronic control unit (ECU) 110 for controlling the engine 10. The second receiver may include a horsepower measuring sensor for the hydraulic pump. For example, the horsepower measuring sensor for the hydraulic pump may include a pressure sensor 122, a flow sensor 124, etc. The third receiver may include a horsepower measuring sensor for the work apparatus. The horsepower measuring sensor for the work apparatus may include an angular velocity sensor 130, a displacement sensor, an angle sensor, etc.

The ECU 110 may receive measurements (engine RPM, fuel injection rate, etc) about an engine operating condition from various measurement instruments and sensors. These measurements may be used to calculate a horsepower generated by the engine 10. The pressure sensor 122 and the flow sensor 124 may detect a pressure and a flow rate of the hydraulic pump 20. The angular velocity sensor 130 may detect a rotation velocity of the work apparatus 30, and the displacement sensor may detect a position change of the work apparatus 30.

The controller 200 may calculate horsepower information of the engine 10, the hydraulic pump 20 and the work apparatus 30 respectively from the state information inputted to the input portion 100 and mutually compare the horsepower information of the engine 10, the hydraulic pump 20 and the work apparatus 30 to determine whether abnormality thereof occurs or not.

In particular, the controller 200 may receive the horsepower information of the engine 10 from the ECU 110 through a controller area network (CAN) or calculate the horsepower information of the engine 10 based on the measurements received from the ECU 110. The controller 200 may receive the measurements of pressure P ($N/m^3$) and flow rate Q ($m^3$/sec) of the hydraulic pump 20 received from the pressure sensor 122 and the flow sensor 124 and calculate horsepower HP (Nm/sec) of the hydraulic pump 20 by following Equation (1).

$$\text{Horsepower(Nm/sec)}=\text{Pressure}(N/m^2)\times\text{Flow rate}(m^3/\text{sec}) \quad \text{Equation (1)}$$

The controller 200 may receive the velocity information of the work apparatus 30 and calculate horsepower informing of the work apparatus 30. For example, the controller 20 may use the measurements of the angular velocity sensor 130 to obtain a rotational velocity of the work apparatus 30 and rotational energy, and divide the rotational energy by time to calculate the horsepower information (HP) of the work apparatus 30 by following Equation (2). Alternatively, the controller 200 may use the measurements of the displacement sensor or the angle sensor to calculate the horsepower information (HP) of the work apparatus 30.

$$\text{Horsepower}=\tfrac{1}{2}\times\text{Inertia moment}\times(\text{angular velocity})^2/\text{time} \quad \text{Equation (2)}$$

Here, Inertia moment is a value of Inertia Moment of the work apparatus (30) such as the boom, the arm, the bucket, etc., and the value of Inertia Moment for the work apparatus may be stored as a parameter in the controller 200 in advance and may be used to calculate the horsepower information of the work apparatus 30.

The controller 200 may calculate and mutually compare the horsepower information of the engine 10, the hydraulic pump 20 and the work apparatus 30 to determine where abnormality occurs or whether the sensor itself is abnormal or not. The output portion 300 may output a determination result of the abnormality in the work system. The output portion 300 may include at least one of an output device 310 and a communication device 320.

The output device 310 may output directly the result of the abnormality determined by the controller 200 to a user of the construction machinery. The communication device 320 may transmit the result of the abnormality determined by the controller 200 to an external manufacturer.

Accordingly, the result of the abnormality in the work system of the construction machinery may be provided to a user as well as a manufacturer of construction machinery, thereby enabling faster situation awareness.

Hereinafter, an abnormality diagnostic method for a work system of construction machinery performed by the controller 200 of the abnormality diagnostic system will be explained in detail.

Figure 5:
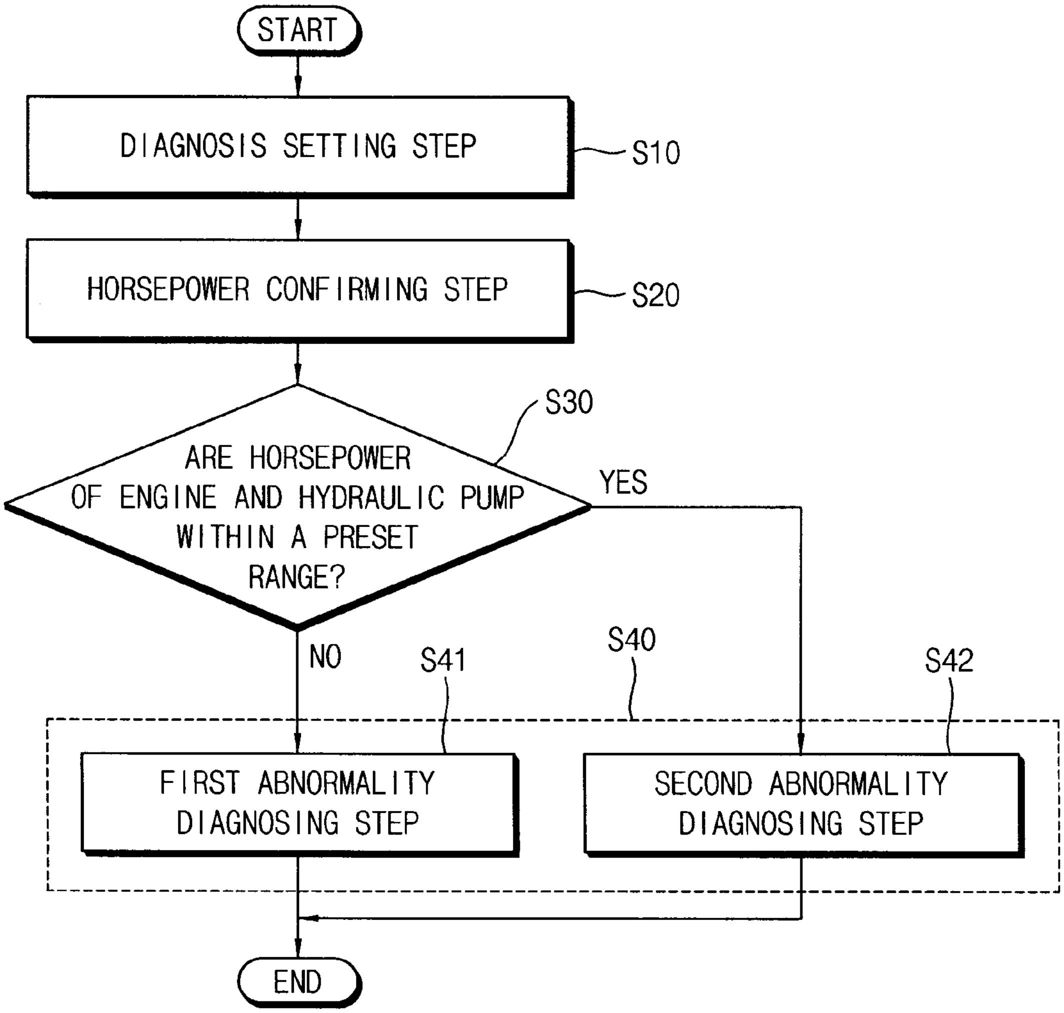
FIG. 5 is a flow chart illustrating a method of diagnosing abnormality in a work system of construction machinery in accordance with example embodiments.

FIG. 5 is a flow chart illustrating a method of diagnosing abnormality in a work system of construction machinery in accordance with example embodiments. An abnormality diagnostic method for the work system of construction machinery will be explained with reference to FIG. 5.

An abnormality diagnostic method for the work system of the construction machinery may include a diagnosis setting step S10, a horsepower confirming step S20, a range determining step S30 and a diagnosing step S40.

In the diagnosis setting step S10, an abnormality diagnosis mode may be set in order to initiate an abnormality diagnostic method for the work system of the construction machinery. When the diagnosis setting step S10 starts, the main control valve 22 may be closed such that the hydraulic oil may not be supplied the cylinder of the work apparatus 30, the work apparatus 30 may stop to operate, and the construction machinery may stop to travel and work.

In the horsepower confirming step S20, horsepower of the engine 10 and the hydraulic pump 20 may be obtained. As mentioned above, the horsepower information of the engine 10 may be calculated using the measurement from the ECU 110 and the horsepower information of the hydraulic pump 20 may be calculated using the pressure and the flow rate of the hydraulic pump 20 from the pressure sensor 122 and the flow sensor 124 provided in the hydraulic pump 20.

In addition, in the horsepower confirming step S20, the work apparatus 30 may not operate.

In the range determining step S30, whether each of the horsepower information of the engine 10 and the hydraulic pump 20 is within a preset range. The preset range may include margin of error for a normal power loss which is generated when transmitting power in the work system of the construction machinery.

That is, since the work system of the construction machinery, the hydraulic pump 20 is driven by the engine 10 and the work apparatus 30 is driven by the hydraulic oil discharged from the hydraulic pump 20, when auxiliary equipments for assisting an operation of the engine 10, such as an alternator, a power steering device, an air conditioner, etc., do not operate, the horsepower of the engine 10, the hydraulic pump 20 and the work apparatus 30 may have theoretically constant values respectively.

However, because power loss is generated actually in the work system due to friction, heat, etc., the preset range may be defined to include the horsepower information having theoretically constant values as well as the margin range of error for the normal power loss which is generated when transmitting power in the work system, and hereinafter, the preset range may be referred to as a permissible normal range to have the above meaning.

Here, the margin of error for the normal power loss generated when transmitting power between the engine 10, the hydraulic pump 20 and the work apparatus 30 may be detected in advance and may be stored as a parameter in the controller 200.

In the diagnosing step S40, whether abnormality occurs in the engine 10, the hydraulic pump 20 and the work apparatus 30 or not may be determined based on a determination result of the range determining step S30.

The diagnosing step S40 may include a first abnormality diagnosing step S41 and a second abnormality diagnosing step S42. When it is determined that the horsepower information of the engine 10 and the hydraulic pump 20 are different from each other by the preset range or more (the horsepower information thereof are not within the preset range), the first abnormality diagnosing step S41 may start. In the first abnormality diagnosing step S41, whether abnormality occurs in any one of the engine 10 and the hydraulic pump 20 may be determined.

That is, if a power flow in the work system of the construction machinery is normal, each of the horsepower information of the engine 10 and the hydraulic pump 20 may be within the preset range. If it is out of the preset range, it means that power loss generated when transmitting power between the engine 10 and the hydraulic pump 20 may deviate the margin of error, and thus, it may be known that abnormality occurs in at least one of the engine 10 and the hydraulic pump 20.

Accordingly, in the first abnormality diagnosing step S41, whether abnormality occurs in any one of the engine 10 and the hydraulic pump 20 may be determined.

On the other hand, when it is determined that the horsepower information of the engine 10 and the hydraulic pump 20 are within the preset range with respect to each other, the second abnormality diagnosing step S42 may start. In the second abnormality diagnosing step S42, whether abnormality occurs in the work apparatus 30 may be determined.

That is, if each of the horsepower of the engine 10 and the hydraulic pump 20 is within the preset range, it means that power flow in the work system of the construction machinery is in a normal state, and then, whether abnormality occurs in the work apparatus 30 may be determined.

Hereinafter, the first abnormality diagnosing step S41 will be explained in detail with reference to FIGS. 6 and 7 and the second abnormality diagnosing step S42 will be explained in detail with reference to FIG. 8. The first abnormality diagnosing step S41 will be explained in two cases. In the first case, whether or not abnormality occurs in the engine 10 is considered, but in the second case, whether or not abnormality occurs in the engine 10 is not considered.

That is, in the second case, there are various sensors and methods for diagnosing the engine 10 and even though abnormality occurs in the engine 10, it will resolve itself, and thus, whether or not abnormality occurs in the engine 10 may not be required to be considered. In the first case, if abnormality occurs in the engine 10 it will not resolve itself, and thus, whether or not abnormality occurs in the engine 10 may be required to be considered.

Figure 6:
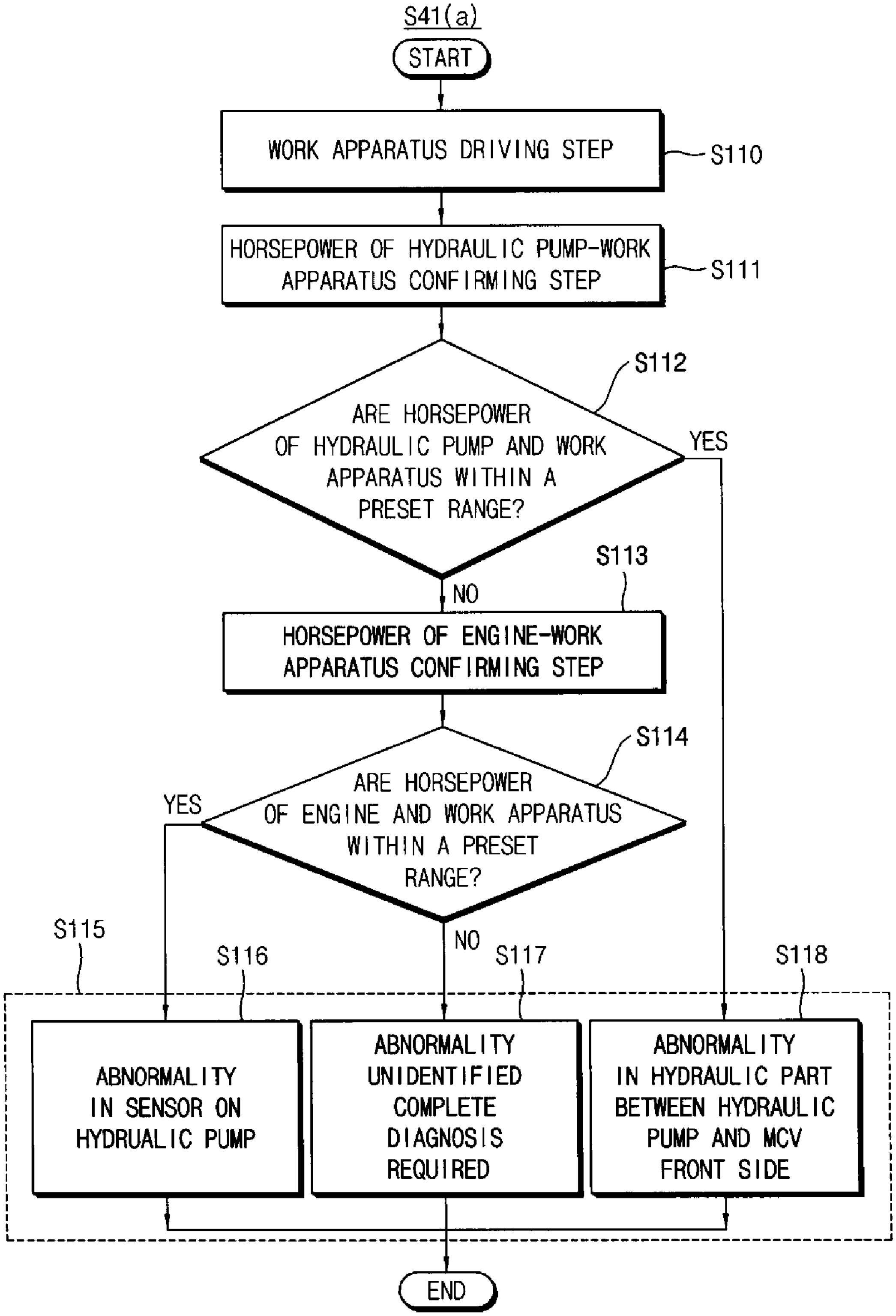
FIG. 6 is a flow chart illustrating the first abnormality diagnosing step of the abnormality diagnostic method for a work system of construction machinery in accordance with an example embodiment.

FIG. 6 is a flow chart illustrating the first abnormality diagnosing step of the abnormality diagnostic method for a work system of construction machinery in accordance with an example embodiment. The second case of the first abnormality diagnosing step S41(*a*) that even though abnormality occurs in the engine 10, it will resolve itself, and thus, whether or not abnormality occurs in the engine 10 may not be required to be considered will be explained with reference to FIG. 6.

The first abnormality diagnosing step S41(*a*) may include a work apparatus driving step S110, a horsepower of hydraulic pump-work apparatus confirming step S111, a range of hydraulic pump-work apparatus determining step S112, a horsepower of engine-work apparatus confirming step S113, a range of engine-work apparatus determining step S114 and a first abnormality determining step S115.

Firstly, in the work apparatus driving step S110, the stopped work apparatus 30 may be driven. When, in the range determining step S30 in FIG. 5, it is determined that each of the horsepower information of the engine 10 and the hydraulic pump 20 is not within the preset range, in order to identify whether abnormality occurs in any one of the engine and the hydraulic pump 20, the work apparatus 30 may be driven.

In the horsepower of hydraulic pump-work apparatus confirming step S111, horsepower information of the hydraulic pump 20 and the work apparatus 30 may be confirmed. While the work apparatus 30 operates, the horsepower information of the hydraulic pump 20 and the work apparatus 30 may be obtained.

The horsepower of the work apparatus 30 may be calculated using the measurement from the angular velocity sensor 130 installed in the work apparatus 30. Alternatively, the horsepower of the work apparatus 30 may be calculated using the measurement from the displacement sensor or the angle sensor installed in the work apparatus 30.

In the range of hydraulic pump-work apparatus determining step S112, whether or not each of the horsepower information of the hydraulic pump 20 and the work apparatus 30 is within a preset range may be determined. When it is determined that each of the horsepower information is not within the preset range, it may be known that power loss generated when transmitting power between the engine 10, the hydraulic pump 20 and the work apparatus 30 deviates the margin of error for the normal power loss. And then, a following step of confirming and mutually comparing the horsepower information of the engine 10 and the work apparatus 30 may be performed.

On the other hand, when it is determined that each of the horsepower information is within the preset range in the range of hydraulic pump-work apparatus determining step S112, the first abnormality determining step S115 may start. The determination result of the step S115 will be described as later.

In the horsepower of engine-work apparatus confirming step S113, when it is determined that the horsepower information of the hydraulic pump 20 and the work apparatus 30 are within the preset range in the range of hydraulic pump-work apparatus determining step S112, the horsepower information of the engine 10 and the work apparatus 30 may be confirmed.

In the range of engine-work apparatus determining step S114, whether or not each of the horsepower information of the engine 10 and the work apparatus 30 is within a preset range may be determined.

Finally, in the first abnormality determining step S115, whether or not abnormality occurs in the hydraulic pump 20 may be determined based the determination result of the range of hydraulic pump-work apparatus determining step S112 and the range of engine-work apparatus determining step S114.

When it is determined that each of the horsepower information of the hydraulic pump 20 and the work apparatus 30 are within the preset range in the range of hydraulic pump-work apparatus determining step S112, the first abnormality determining step S115 may start to determine that abnormality occurs in the hydraulic pump 20 (S118).

In particular, in the case that the horsepower values of the hydraulic pump 20 and the work apparatus 30 are within the preset range, the horsepower values of the engine 10 and the hydraulic pump 20 may be not within the preset range. These may mean that abnormality occurs in the hydraulic pump 20 or in a hydraulic part between a rear side of the hydraulic pump 20 and a front side of the main control valve 22, thereby causing power loss when transmitting power.

Accordingly, in the step S118, it may be diagnosed that abnormality occurs in the hydraulic pump 20 or in the hydraulic part between the rear side of the hydraulic pump 20 and the front side of the main control valve 22.

On the other hand, when it is determined that each of the horsepower information of the engine 10 and the work apparatus 30 is within the preset range in the range of engine-work apparatus determining step S114, the first abnormality determining step S115 may start to determine that abnormality occurs in the pressure sensor 122 and the flow sensor 124 provided on the hydraulic pump 20 (S116).

In the step S116, the case that the horsepower values of the engine 10 and the work apparatus 30 are within the preset range may mean that power may be transferred normally from the engine 10 to the work apparatus 30, that is, abnormality may not occur in the power flow, and thus, it may be diagnosed that abnormality may occur in the pressure sensor 122 and the flow sensor 124 for detecting the horsepower value of the hydraulic pump 20.

In addition, when it is determined that each of the horsepower information of the engine 10 and the work apparatus 30 is not within the preset range in the range of engine-work apparatus determining step S114, the first abnormality determining step S115 may start to determine that individual complete diagnosis is required for the entire work system of the construction machinery (S117).

In this case, it may be shown that abnormality occurs between the engine 10 and the hydraulic pump 20, between the hydraulic pump 20 and the work apparatus 30 and between the engine 10 and the work apparatus 30. That is, since abnormality position is not indentified, it may be diagnosed that the individual complete diagnosis is required for the entire work system of the construction machinery.

Figure 7A:
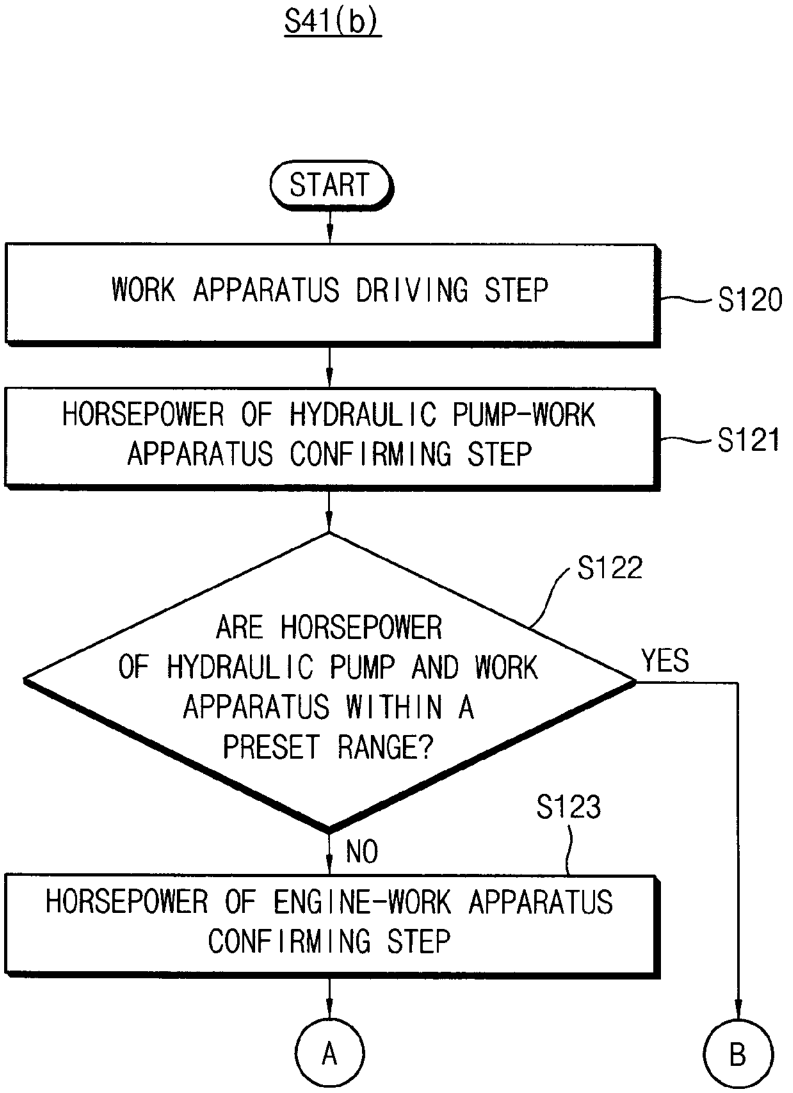
FIGS. 7A and 7B are a flow chart illustrating the first abnormality diagnosing step of the abnormality diagnostic method for a work system of construction machinery in accordance with another example embodiment.
Figure 7B:
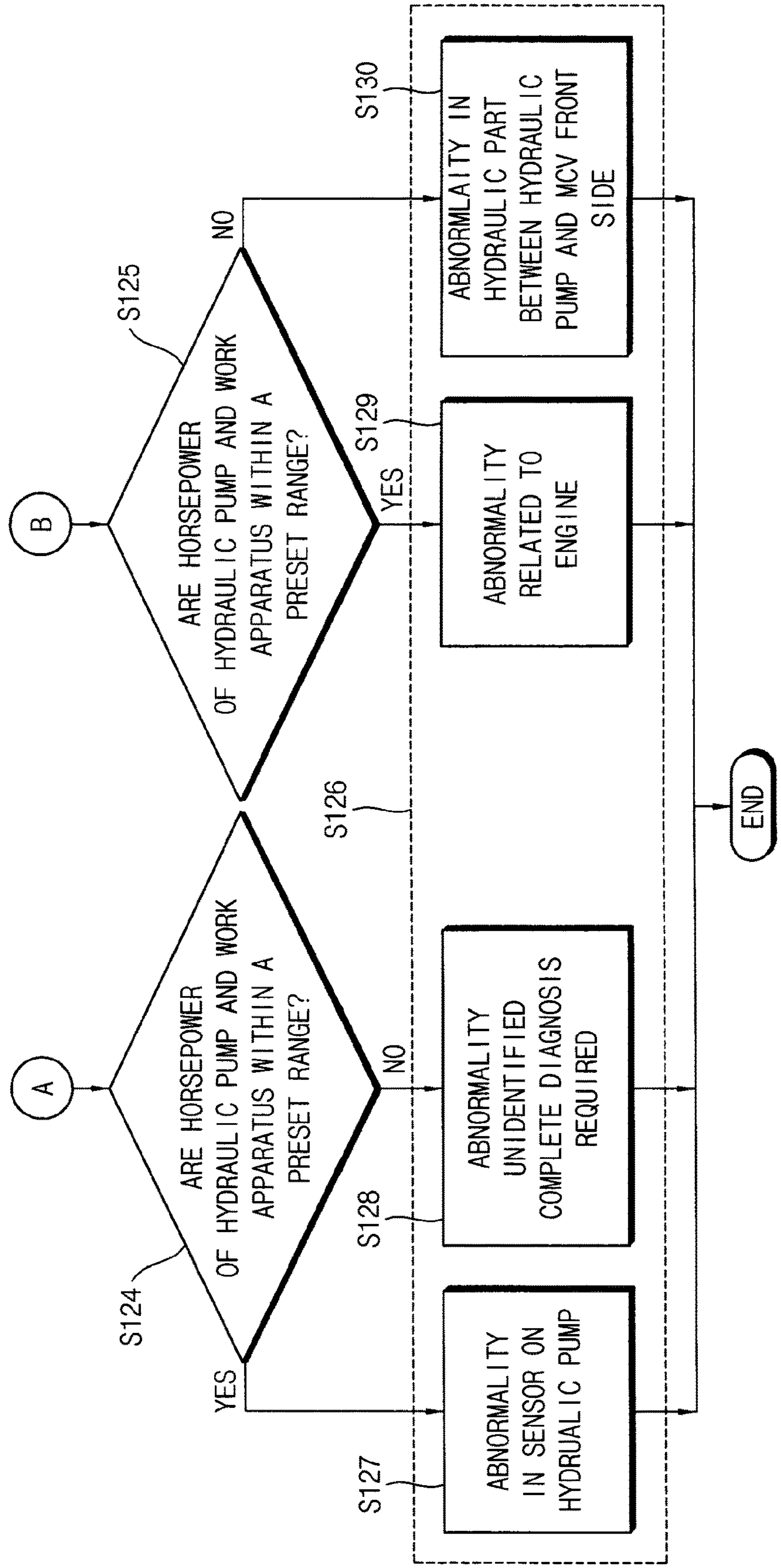

FIGS. 7A and 7B are a flow chart illustrating the first abnormality diagnosing step of the abnormality diagnostic method for a work system of construction machinery in accordance with another example embodiment. The first case of the first abnormality diagnosing step S41(*b*) that if abnormality occurs in the engine 10, it will not resolve itself, and thus, whether or not abnormality occurs in the engine 10 may be required to be considered will be explained with reference to FIGS. 7A and 7B.

The first abnormality diagnosing step S41(*b*) may include a work apparatus driving step S120, a horsepower of hydraulic pump-work apparatus confirming step S121, a range of hydraulic pump-work apparatus determining step S122, a horsepower of engine-work apparatus confirming step S123, a range of engine-work apparatus determining step S124, a horsepower comparing step S125 and a first abnormality determining step S126.

Here, the work apparatus driving step S120, the horsepower of hydraulic pump-work apparatus confirming step S121, the range of hydraulic pump-work apparatus determining step S122, the horsepower of engine-work apparatus confirming step S123, the range of engine-work apparatus determining step S124, and a step S127 of determining that abnormality occurs in a pressure sensor 122 and a flow sensor 124 provided on the hydraulic pump 20 and a step S128 of determining that individual complete diagnosis is required for the entire work system of the construction machinery of the first abnormality determining step S126 in the first abnormality diagnosing step S41(*b*) may be substantially the same as or similar to the work apparatus driving step S110, the horsepower of hydraulic pump-work apparatus confirming step S111, the range of hydraulic pump-work apparatus determining step S112, the horsepower of engine-work apparatus confirming step S113, the range of engine-work apparatus determining step S114, and the step S116 of determining that abnormality occurs in a pressure sensor 122 and a flow sensor 124 provided on the hydraulic pump 20 and a step S117 of determining that individual complete diagnosis is required for the entire work system of the construction machinery of the first abnormality determining step S115 in the first abnormality diagnosing step S41(*a*).

Thus, hereinafter, the horsepower comparing step S125 and a corresponding step of the first abnormality determining step S126 of the first abnormality diagnosing step S41(*b*) will be explained in detail.

In the horsepower comparing step S125, when, in the range of hydraulic pump-work apparatus determining step 122, it is determined that each of the horsepower of the hydraulic pump 20 and the work apparatus 30 is not within the preset range, the horsepower of the hydraulic pump 20 and the work apparatus 30 may be compared with the horsepower of the engine 10.

And then, in the first abnormality determining step S126, whether or not abnormality occurs in the engine 10 and the hydraulic pump 20 may be determined based on the determination result of the horsepower comparing step S125.

When, in the horsepower comparing step S125, it is determined that the horsepower of the engine 10 is less than each of the hydraulic pump 20 and the work apparatus 30, the first abnormality determining step S126 may start and diagnose that abnormality occurs in the engine 10.

That is, because the hydraulic pump 20 and the work apparatus 30 may be driven through the power of the engine 10 in the power flow of the work system, the horsepower of the hydraulic pump 20 or the work apparatus 30 may be less than the horsepower of the engine 10. However, if the horsepower of the engine 10 is less than the detected horsepower of the hydraulic pump 20 or the work apparatus 30, the first abnormality determining step S126 may diagnose that abnormality related to the engine 10 occurs.

On the other hand, when, in the horsepower comparing step S125, it is determined that the horsepower of the engine 10 is greater than each of the hydraulic pump 20 and the work apparatus 30, the first abnormality determining step S126 may start and diagnose that abnormality occurs in the hydraulic pump 20.

When each of the horsepower of the hydraulic pump 20 and the work apparatus 30 is within the preset range and is less than the horsepower of the engine 10, it may be known that the power flow is in a normal state.

However, because it is determined that each of the horsepower of the engine 10 and the hydraulic pump 20 is not within the preset range, in the range determining step S30 of FIG. 5, it may be diagnosed that abnormality occurs in the hydraulic pump 20 or in the hydraulic part between the rear side of the hydraulic pump 20 and the front side of the main control valve 22.

Accordingly, in the step S130, it may be diagnosed that power loss is generated in the hydraulic pump 20 or in the hydraulic part between the rear side of the hydraulic pump 20 and the front side of the main control valve 22.

Figure 8:
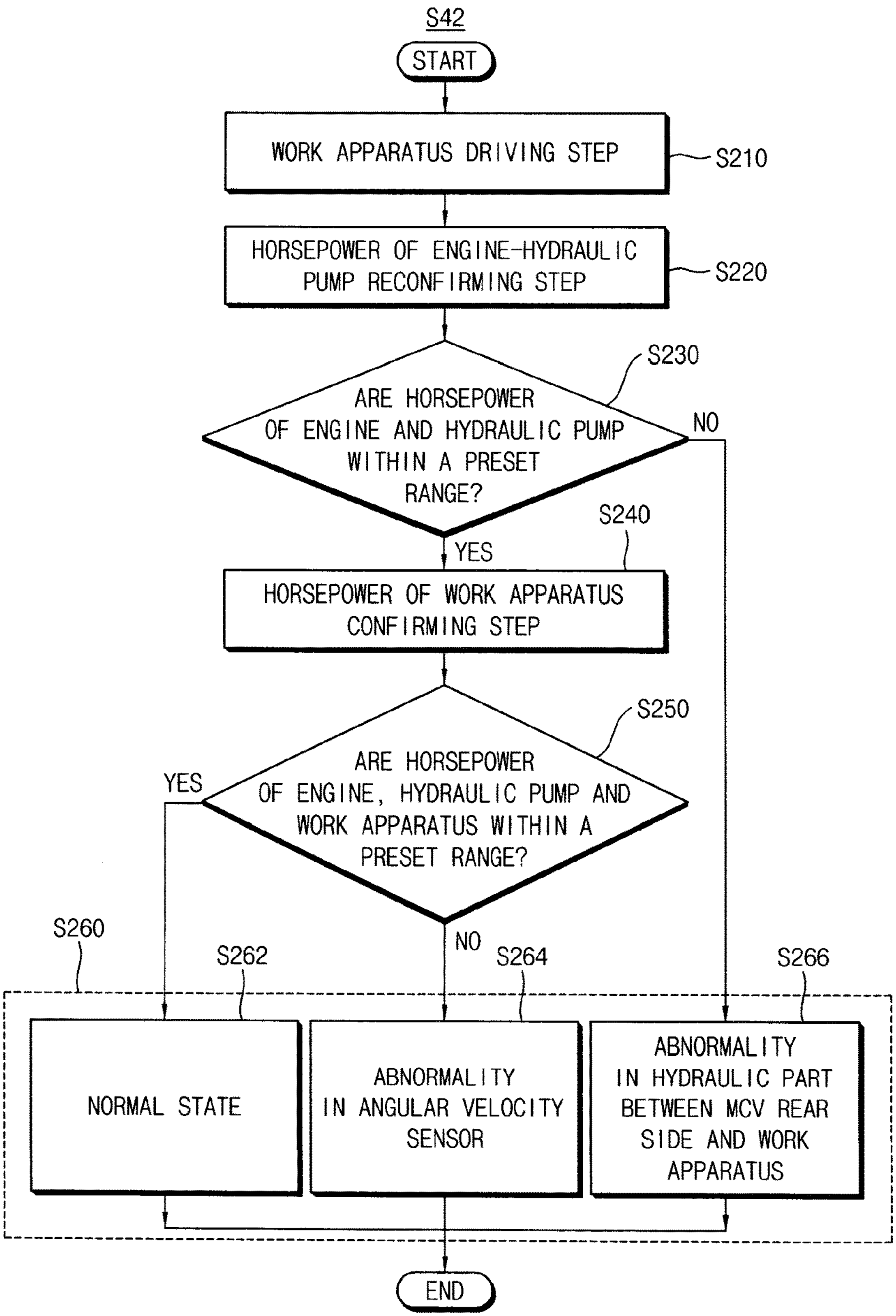
FIG. 8 is a flow chart illustrating the second abnormality diagnosing step of the abnormality diagnostic method for a work system of construction machinery in accordance with example embodiments.

FIG. 8 is a flow chart illustrating the second abnormality diagnosing step of the abnormality diagnostic method for a work system of construction machinery in accordance with example embodiments. The second abnormality diagnosing step S42 will be explained in detail with reference to FIG. 8.

As mentioned above, when it is determined that each of the horsepower information of the engine 10 and the hydraulic pump 20 is within the preset range in the range determining step S30, the second abnormality diagnosing step S42 of the diagnosing step S40 may start to determine whether or not abnormality occurs in the work apparatus 30.

That is, in the case that each of the horsepower of the engine 10 and the hydraulic pump 20 is within the preset range, it may be known that the power flow between the engine 10 and the hydraulic pump 20 is in a normal state, and then, the second abnormality diagnosing step S42 may start to determine whether or not abnormality occurs in the work apparatus 30.

The second abnormality diagnosing step S42 may include a work apparatus driving step S210, a horsepower of engine-hydraulic pump reconfirming step S220, a range of engine-hydraulic pump determining step S230, a horsepower of work apparatus confirming step S240, a range of engine-hydraulic pump-work apparatus determining step S250 and a second abnormality determining step S260.

Firstly, in the work apparatus driving step S210, the stopped work apparatus 30 may be driven. When, in the range determining step S30 in FIG. 5, it is determined that each of the horsepower of the engine 10 and the hydraulic pump 20 is not within the preset range, the power flow between the engine 10 and the hydraulic pump 20 may be determined as a normal state, and further, in order to more identify whether abnormality occurs in any one of the engine 10 and the hydraulic pump 20, the work apparatus 30 may be driven.

In the horsepower of engine-hydraulic pump reconfirming step S220, while the work apparatus 30 operates, the horsepower values of the engine 10 and the hydraulic pump 20 may be reconfirmed.

In the range of engine-hydraulic pump determining step S230, whether or not each of the horsepower information of the engine 10 and the hydraulic pump 20 is within a preset range may be determined. When it is determined that the horsepower information is within the preset range, it may be known that power loss generated when transmitting power between the engine 10 and the hydraulic pump 20 does not deviates the margin of error for the normal power loss. And then, following steps of confirming the horsepower information of the work apparatus 30 and mutually comparing the engine 10, the hydraulic pump 20 and the work apparatus 30 may be performed.

On the other hand, when it is determined that each of the horsepower information of the engine 10 and the hydraulic pump 20 is not within the preset range in the range of engine-hydraulic pump determining step S230, the second abnormality determining step S260 may start. The determination result of the step S260 will be described as later.

In the horsepower of work apparatus confirming step S240, when it is determined that each of the horsepower information of the engine 10 and the hydraulic pump 20 is within the preset range in the range of engine-hydraulic pump determining step S230, the horsepower information of the work apparatus 30 may be confirmed.

Here, the horsepower of the work apparatus 30 may be detected and confirmed by the angular velocity sensor 130 provided on the work apparatus 30.

In the range of engine-hydraulic pump-work apparatus determining step S250, whether or not each of the horsepower information of the engine 10, the hydraulic pump 20 and the work apparatus 30 is within a preset range may be determined.

Finally, in the second abnormality determining step S260, whether or not abnormality occurs in the work apparatus may be determined based the determination result of the range of hydraulic pump-work apparatus determining step S230 and the range engine-hydraulic pump-work apparatus determining step S250.

When it is determined that each of the horsepower information of the engine 10 and the hydraulic pump 20 is not within the preset range in the range of engine-hydraulic pump determining step S230, the second abnormality determining step S260 may start to determine that abnormality occurs in the work apparatus 30 (S266).

In particular, in the case that the horsepower values of the engine 10 and the hydraulic pump 20 are within the preset range before the work apparatus 30 operates as shown in the range determining step S30 of FIG. 5, but the horsepower values of the engine 10 and the hydraulic pump 20 may be not within the preset range, it may be known that abnormality occurs in a hydraulic part between a rear side of the main control valve 22 and a front side of the main control valve 22 and the work apparatus 30.

That is, in the case that the control valve for operating the work apparatus 30 is opened, only the hydraulic part between the rear side of the main control valve 22 and the front side of the main control valve 22 and the work apparatus 30 may be added to the power flow, and then, it may be diagnosed that abnormality may occur in the hydraulic part between the rear side of the main control valve 22 and the front side of the main control valve 22 and the work apparatus 30.

On the other hand, when it is determined that each of the horsepower information of the engine 10, the hydraulic pump 20 and the work apparatus 30 is within the preset range in the range of engine-hydraulic pump-work apparatus determining step S250, the second abnormality determining step S260 may start to determine that the power flow is in a normal state in the work system of the construction machinery (S262).

In particular, when it is determined that each of the horsepower information of the engine 10, the hydraulic pump 20 and the work apparatus 30 is within the preset range, it may be known that power loss generated when transmitting power between the engine 10, the hydraulic pump 20 and the work apparatus 30 does not deviates the margin of error for the normal power loss, and thus, it may be diagnosed that the power flow in the work system is in a normal state.

In addition, when it is determined that each of the horsepower information of the engine 10, the hydraulic pump 20 and the work apparatus 30 is within the preset range in the range of engine-hydraulic pump-work apparatus determining step S250, the second abnormality determining step S260 may start to determine that abnormality occurs in the angular velocity sensor 130 provided on the work apparatus 30 (S264).

In the step S264, in the case that the horsepower values of the engine 10 and the hydraulic pump 20 are within the preset range, but the horsepower value of the work apparatus 30 deviates from the preset range between the horsepower values of the engine 10 and the hydraulic pump 20, it may be diagnosed that abnormality occurs in the angular velocity sensor 130.

That is, when the horsepower values of the engine 10 and the hydraulic pump 20 are within the preset range, because the work apparatus 30 is connected thereto by hydraulic parts, it may be known that the power flow between the engine 10, the hydraulic pump 20 and the work apparatus 30 is in a normal state, but since the horsepower value of the work apparatus 30 detected by the angular velocity sensor 130 is not within the preset range, it may be known that abnormal occurs in the angular velocity sensor 130.

According to an abnormality diagnostic system for a work system of construction machinery and an abnormality diagnostic method using the same in accordance with example embodiments, reliability and accuracy may be secured and time-consuming problems may be resolved in the abnormality diagnostic method of the construction machinery.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. An abnormality diagnostic system for a work system of construction machinery, the abnormality diagnostic system comprising:

an input portion configured to receive state information of an engine, a hydraulic pump driven by the engine and a work apparatus of the construction machinery to which a hydraulic oil discharged from the hydraulic pump is supplied;

a controller configured to calculate horsepower information of the engine, the hydraulic pump and the work apparatus from the received state information and compare each of the horsepower information of the engine, the hydraulic pump, and the work apparatus with a respective preset range, wherein if each of the horsepower information is not within the respective preset range, the controller is further configured to determine whether or not abnormality occurs in at least corresponding one of the engine, the hydraulic pump and the work apparatus; and an output portion configured to output the determination result of abnormality, wherein the input portion comprises an electronic control unit (ECU) configured to detect the horsepower generated by the engine, a pressure sensor configured to detect a pressure of the hydraulic oil discharged from the hydraulic pump, a flow sensor configured to detect a flow rate of the hydraulic oil discharged from the hydraulic pump, and a sensor configured to obtain the state information of the work apparatus, wherein the horsepower information of the work apparatus is calculated using velocity information obtained from an angular velocity sensor, a displacement sensor or an angle sensor installed in the work apparatus, and wherein the controller determines whether or not each of the horsepower information of the engine and the hydraulic pump is not within the preset range, when it is determined that each of the horsepower information of the engine and the hydraulic pump is not within the preset range, the controller controls to drive the work apparatus and determines whether or not each of the horsepower information of the hydraulic pump and the work apparatus is within the preset range, and when it is determined that each of the horsepower information of the hydraulic pump and the work apparatus is not within the preset range, the controller determines whether or not each of the horsepower information of the engine and the work apparatus is within the preset range, to determines abnormality of the hydraulic pump based on the determination results.

2. The abnormality diagnostic system of claim 1, wherein the output portion comprises an output device configured to output the result of the abnormality determined by the controller to a user of the construction machinery; and a communication device configured to remotely transmit the result of the abnormality determined by the controller.

3. An abnormality diagnostic method for a work system of construction machinery, the abnormality diagnostic method performed by a controller, and the method comprising:

a first step of setting an abnormality diagnosis mode in the construction machinery;

a second step of obtaining horsepower information of an engine from an electronic control unit (ECU), calculating horsepower information of a hydraulic pump driven by the engine using measurements detected by a pressure sensor and a flow sensor provided on the hydraulic pump and calculating horsepower information of a work apparatus of the construction machinery to which a hydraulic oil discharged from the hydraulic pump is supplied;

a third step of determining whether or not each of the horsepower information of the engine the hydraulic pump and the work apparatus is within a respective preset range; and a fourth step of determining abnormality of the engine or the hydraulic pump or the work apparatus according to the determination result from the third step, wherein if it is determined that each of the horsepower information of the engine and the hydraulic pump is not within the preset range in the third step, the fourth step further comprises:

a sixth step of driving the work apparatus;

a seventh step of confirming horsepower of the hydraulic pump and the work apparatus;

a eighth step of determining whether or not each of the horsepower information of the hydraulic pump and the work apparatus is within the preset range;

a ninth step of determining whether or not each of the horsepower information of the engine and the work apparatus is within the preset range when it is determined that each of the horsepower information of the hydraulic pump and the work apparatus is not within the preset range in the eighth step; and a first abnormality determining step of determining abnormality of the hydraulic pump based the determination results of the eighth step and the ninth step.

4. The abnormality diagnostic method of claim 3, wherein the first step comprises closing a main control valve (MCV) of the construction machinery to stop to drive a work apparatus when the first step starts.

5. The abnormality diagnostic method of claim 3, wherein, in the third step, the preset range includes a margin of error for a normal power loss which is generated when transmitting power in the work system of the construction machinery.

6. The abnormality diagnostic method of claim 3, wherein, when it is determined in the third step that the horsepower information of the hydraulic pump and the work apparatus are within the preset range, and the horsepower information of the engine is not within the preset range, and it is determined in the seventh step that each of the horsepower information of the hydraulic pump and the work apparatus is within the preset range, the first abnormality determining step comprises determining that abnormality occurs in the hydraulic pump.

7. The abnormality diagnostic method of claim 3, wherein, when it is determined in the third step that each of the horsepower information of the engine and the work apparatus is within the preset range, and the horsepower information of the hydraulic pump is not within the preset range, and it is determined in the ninth step that each of the horsepower information of the engine and the work apparatus is within the preset range, the first abnormality determining step comprises determining that abnormality occurs in the pressure sensor or the flow sensor provided on the hydraulic pump.

8. The abnormality diagnostic method of claim 3, wherein, when it is determined in the third step that each of the horsepower information of the engine and the hydraulic pump is within the preset range, and the horsepower information of the work apparatus is not within the preset range, the fourth step comprises determining that abnormality occurs in the work apparatus.

9. The abnormality diagnostic method of claim 3, wherein, when it is determined in the third step that each of the horsepower information of the hydraulic pump and the work apparatus is within the preset range, and the horsepower information of the engine is not within the preset range, the fourth step comprises determining that abnormality occurs in the engine.

* * * * *